May 8, 1934.  P. A. POWELL  1,958,313
PISTON RING
Filed July 24, 1933
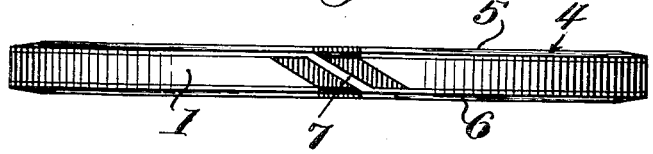
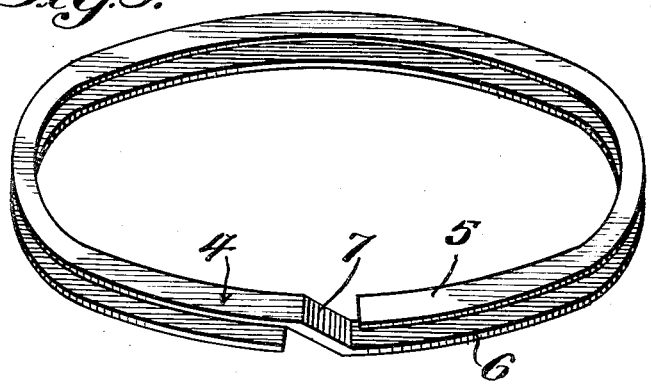
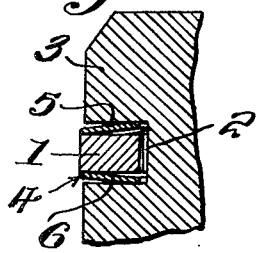
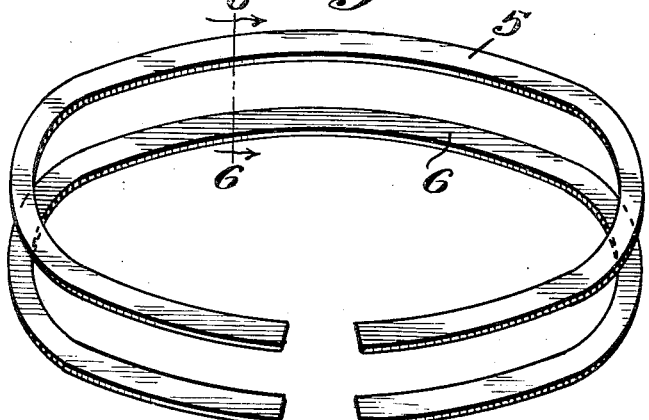
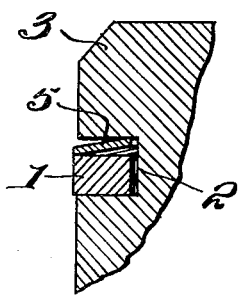
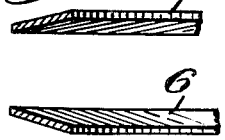
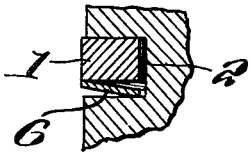
Perry A. Powell,
INVENTOR
BY Victor J. Evans & Co.
ATTORNEY
WITNESS: J. T. L. Wright Patented May 8, 1934

1,958,313

UNITED STATES PATENT OFFICE 1,958,313

PISTON RING

Perry A. Powell, Grand Island, Nebr.

Application July 24, 1933, Serial No. 681,990

4 Claims. (Cl. 309—24)

This invention relates to piston rings and has for the primary object the provision of a device of the above stated character which will provide an effective seal between the pistons and the walls of the cylinder to prevent loss of compression and also of liquid and also reduce wear on the walls of the cylinder to a minimum.

With these and other objects in view this invention consists in certain novel features of construction, combination and arrangement of parts to be hereinafter more fully described and claimed.

For a complete understanding of my invention, reference is to be had to the following description and accompanying drawing, in which In the drawing:

Figure 1 is a side elevation illustrating a piston ring constructed in accordance with my invention.

Figure 2 is a fragmentary transverse sectional view illustrating the same.

Figure 3 is a perspective view illustrating a tensioning medium.

Figure 4 is a fragmentary transverse sectional view illustrating the installation of the ring in the groove of the piston.

Figure 5 is a perspective view illustrating a modified form of tensioning means.

Figure 6 is a transverse sectional view taken on the line 6—6 of Figure 5.

Figure 7 is a fragmentary transverse sectional view illustrating the installation of the modified form of my invention between the upper wall of the ring groove and the body of the ring.

Figure 8 is a similar view showing the tensioning means employed between the lower wall of the ring groove of the piston and the body of the ring.

Referring in detail to the drawing, the numeral 1 indicates an annular body of the split type and is preferably constructed from a malleable material. The ends of the body are preferably cut angularly to snugly fit when brought in contact with each other. The body is inserted in the ring groove 2 of a piston 3.

A tensioning medium 4 is provided for the body 1 and consists of companion annular members 5 and 6, relatively spaced and connected by a portion 7. The tensioning medium 4 receives between its annular portions 5 and 6 the body 1 with the connecting portion 7 extending between the ends of the body. The annular members 5 and 6 diverge from their inner edges towards their outer edges so that when applied to the body 1 and in the groove 2 of the piston, said members 5 and 6 bear against opposite faces of the body and against opposite walls of the groove 2. The outer face of the body contacts with the walls of a cylinder and also the outer edges of the annular portions or members 5 and 6 of the tensioning member. The tensioning member is preferably constructed of a high grade steel so as to have the desired resiliency. Due to the annular members 5 and 6 contacting with the walls of the cylinder along with the body 1 and also engaging opposite faces of the body 1 and opposite walls of the groove of the piston will provide an effective seal between the piston and the walls of the cylinder. Compression and lubrication will be prevented from passing between the body 1 and the walls of the groove of the piston thereby reducing waste of lubrication and loss of compression to a minimum.

As shown in Figure 5 the annular members 5 and 6 may be employed unattached by omitting the connecting portion 7 and may be employed in pairs upon the body or singularly, as shown in Figures 7 and 8.

Having described the invention, I claim:

1. A piston ring comprising a split annular body, annular tension strips engaging opposite faces of the body and opposite walls of a ring groove of a piston, and means connecting the annular tension strips.

2. A piston ring comprising a split annular body, annular tension strips engaging opposite faces of the body and opposite walls of a ring groove of a piston, one of said annular strips connected at one end to the opposite end of the other annular strip.

3. A piston ring comprising a split annular body, flat annular tension strips engaging opposite faces of the body and opposite walls of a ring groove of a piston, said annular strips having spaced ends, and a connecting portion connecting ends of said tension strips and arranged between the split ends of the body.

4. A piston ring comprising an annular split body, annular split tension strips arranged at opposite faces of the body and converging outwardly from their inner edges towards their outer edges to contact with the body at their outer edges and to contact with opposite walls of a ring groove of a piston at their inner edges.

PERRY A. POWELL.